(12) United States Patent
Wan et al.

(10) Patent No.: US 11,947,158 B2
(45) Date of Patent: Apr. 2, 2024

(54) BACKLIGHT MODULE AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventors: Ye Wan, Chongqing (CN); Baohong Kang, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/984,460

(22) Filed: Nov. 10, 2022

(65) Prior Publication Data
US 2023/0152625 A1    May 18, 2023

(30) Foreign Application Priority Data
Nov. 15, 2021  (CN) .......................... 202111351328.4

(51) Int. Cl.
| | |
|---|---|
| F21V 8/00 | (2006.01) |
| G02F 1/1333 | (2006.01) |
| G02F 1/1335 | (2006.01) |
| G02F 1/13357 | (2006.01) |

(52) U.S. Cl.
CPC .......... *G02B 6/0091* (2013.01); *G02B 6/002* (2013.01); *G02B 6/0053* (2013.01); *G02B 6/0055* (2013.01); *G02B 6/0086* (2013.01); *G02F 1/133314* (2021.01); *G02F 1/133317* (2021.01); *G02F 1/133325* (2021.01); *G02F 1/133524* (2013.01); *G02F 1/133605* (2013.01); *G02F 1/133607* (2021.01); *G02F 1/133608* (2013.01); *G02B 6/0028* (2013.01)

(58) Field of Classification Search
CPC .... G02B 6/002; G02B 6/0028; G02B 6/0091; G02F 1/133314; G02F 1/133524
See application file for complete search history.

(56) References Cited

U.S. PATENT DOCUMENTS

| | | | |
|---|---|---|---|
| 9,075,175 B2 * | 7/2015 | Tsai ...................... | G02B 6/0036 |
| 2019/0353959 A1 * | 11/2019 | Wu ........................ | G02B 6/002 |
| 2019/0391316 A1 * | 12/2019 | Masuda ............... | G02B 6/0076 |

FOREIGN PATENT DOCUMENTS

CN           214041936 U   *   8/2021

* cited by examiner

*Primary Examiner* — Keith G. Delahoussaye
(74) *Attorney, Agent, or Firm* — Westbridge IP LLC (57) ABSTRACT

Disclosed are a backlight module and a display device. The backlight module includes a backplane, a light guide plate and a light source. The backplane includes a first surface and a second surface opposite to the first surface. The light guide plate includes a light output portion provided on the first surface and a bending portion provided with a light input end on the second surface, and an end of the light output portion facing the second surface of the backplane is bent and extended to form the bending portion. The light source is provided on the second surface and corresponds to a light input end face of the light input end.

13 Claims, 10 Drawing Sheets

BACKLIGHT MODULE AND DISPLAY DEVICE

CROSS-REFERENCE TO RELATED APPLICATIONS

This application claims priority to Chinese Patent Application No. 202111351328.4, filed on Nov. 15, 2021, the entire contents of which is incorporated herein by reference.

TECHNICAL FIELD

The present disclosure relates to the display technical field, in particular to a backlight module and a display device.

BACKGROUND

At present, the commonly used backlight module for liquid crystal display (LCD) is a side-in backlight module. In this structure, the light guide plate and the light source bar are provided on the same side of the backplane and close to each other. Limited by the thickness and width of the light emitting diode (LED) lamp beads on the light source bar, thinning the frame of the display module will be restricted. After the light guide plate is heated and expanded, the distance between the light guide plate and the LED lamp beads will be shortened, which is easy to squeeze or damage the light source.

SUMMARY

The main objective of the present disclosure is to provide a backlight module, by providing a light input end of the light guide plate and a light source on a lower side of the backplane, aiming to not only achieve a narrower frame and ensure a better light output effect, but also avoid damage to the light source after the expansion of the light guide plate.

In order to achieve the above objectives, the present disclosure provides a backlight module includes a backplane, a light guide plate and a light source. The backplane includes a first surface and a second surface opposite to the first surface. The light guide plate includes a light output portion provided on the first surface and a bending portion provided with a light input end on the second surface, and an end of the light output portion facing the second surface of the backplane is bent and extended to form the bending portion. The light source is provided on the second surface and corresponds to a light input end face of the light input end.

In an embodiment, the bending portion includes a curved section and a straight section. The curved section is connected to the light output portion and the straight section and the straight section is the light input end and includes a surface parallel to a surface of the light output portion and the light input end face perpendicular to the surface of the light output portion.

In an embodiment, a side of the curved section away from the backplane is an arc or a broken line on a longitudinal section of the backlight module and/or a surface facing the backplane and formed by an enclosure of the light output portion and the bending portion is a U-shaped surface.

In an embodiment, at least a portion of the surface of the bending portion away from the backplane is provided with a first reflector and/or a reflective piece is provided between the light output portion and the backplane.

In an embodiment, a thickness of the bending portion is less than a thickness of the light output portion and/or an end face of the backplane facing the bending portion is a curved surface and/or the end face of the backplane facing the bending portion is coated with a protective layer.

In an embodiment, the present disclosure further provides a display device including a display panel provided on a light output side of the light output portion and a backlight module as described above.

In an embodiment, the display device further includes a bracket. The bracket includes a fixation portion installed on the second surface and a shading portion provided at an end of the fixation portion, and the shading portion extends towards the light source and covers a side of the light source away from the backplane.

In an embodiment, the display device further includes a middle frame. The middle frame includes a bottom portion and a side portion connected to an edge of the bottom portion. The bottom portion is supported on a surface of the shading portion away from the light source, and the side portion is attached to a surface of the bending portion away from the backplane.

In an embodiment, the display device further includes a main control board. The bracket further includes an installation portion provided at an another end of the fixation portion, and the main control board is installed on each surface of the installation portion and the shading portion away from the light source and electrically connected to the display panel and the light source.

In an embodiment, a second reflector is provided on a surface of the shading portion facing the light source and/or the display panel includes an array substrate and a color filter substrate opposite to the array substrate. A portion of the array substrate beyond the color filter substrate is electrically connected to the main control board through a chip on film, the chip on film is attached to and extends along a surface of the middle frame away from the light guide plate, and the middle frame is provided with a receiving groove for holding chips of the chip on film.

In the technical solution of the present disclosure, the backlight module includes the backplane, the light guide plate and the light source. The light guide plate includes the light output portion and the bending portion which an end of the light output portion bends and extends to form. The light output portion is provided on the first surface of the backplane, and the light source is provided on the second surface of the backplane. The bending portion is provided on a side face of the backplane, and the light input end is provided on the second surface of the backplane. The light emitted by the light source is received by the light input end face of the light input end on the second surface, then transmitted to the light output portion through total reflection and emitted from the light output side of the light output portion. The light guide plate provided with the bending portion and the light source provided on the second surface not only can reduce the restriction on the frame due to the size of the light source and can effectively realize a narrow frame, but also can make the distance between the light source and the light guide plate not too small when the light guide plate is heated and expanded. Thus, the light source is effectively protected from damage, and the extension space of the backplane is used to effectively reduce the thickness or the frame size. In addition, the bending portion is provided with the light input end provided on the second surface of the backplane. When the light source is directed to the light input end face, the light can smoothly enter the bending portion through the resistance of the light input end, which reduces the probability of direct reflection of the light directed to the bending arc and effectively ensure the light guide effect and the light output effect of the backlight module. Furthermore, the light input end also enables the light guide plate to be clamped on the edge of the backplane. Thus, the installation stability and relative positions of the light guide plate and the backplane are effectively ensured, and the structural stability of the backlight module is improved.

BRIEF DESCRIPTION OF THE DRAWINGS

To illustrate the technical solutions according to the embodiments of the present disclosure or the related art more clearly, the accompanying drawings for describing the embodiments or the related art are introduced briefly in the following. Apparently, the accompanying drawings in the following description are only about some embodiments of the present disclosure, and persons of ordinary skill in the art can derive other drawings from the accompanying drawings without creative efforts.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in detail below with reference to the accompanying drawings. It is obvious that the embodiments described are only some rather than all of the embodiments of the present disclosure. All other embodiments obtained by those skilled in the art based on the embodiments of the present disclosure without creative efforts shall fall within the claimed scope of the present disclosure.

It should be noted that all the directional indications (such as up, down, left, right, front, rear . . . ) in the embodiments of the present disclosure are only used to explain the relative positional relationship, movement, or the like of the components in a certain posture (as shown in the drawings). If the specific posture changes, the directional indication will change accordingly.

In the present disclosure, unless otherwise clearly specified and limited, the terms "connected", "fixed", etc. should be interpreted broadly. For example, "fixed" can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those of ordinary skill in the art, the specific meaning of the above-mentioned terms in the present disclosure can be understood according to specific circumstances.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present disclosure.

Figure 1:
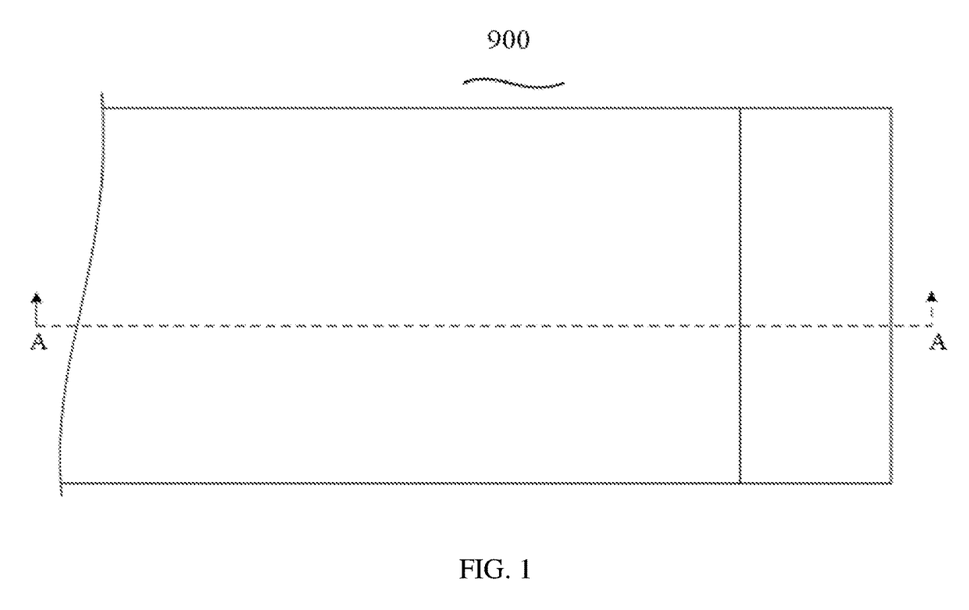
FIG. 1 is a top view of a display device according to an embodiment of the present disclosure.
Figure 2:
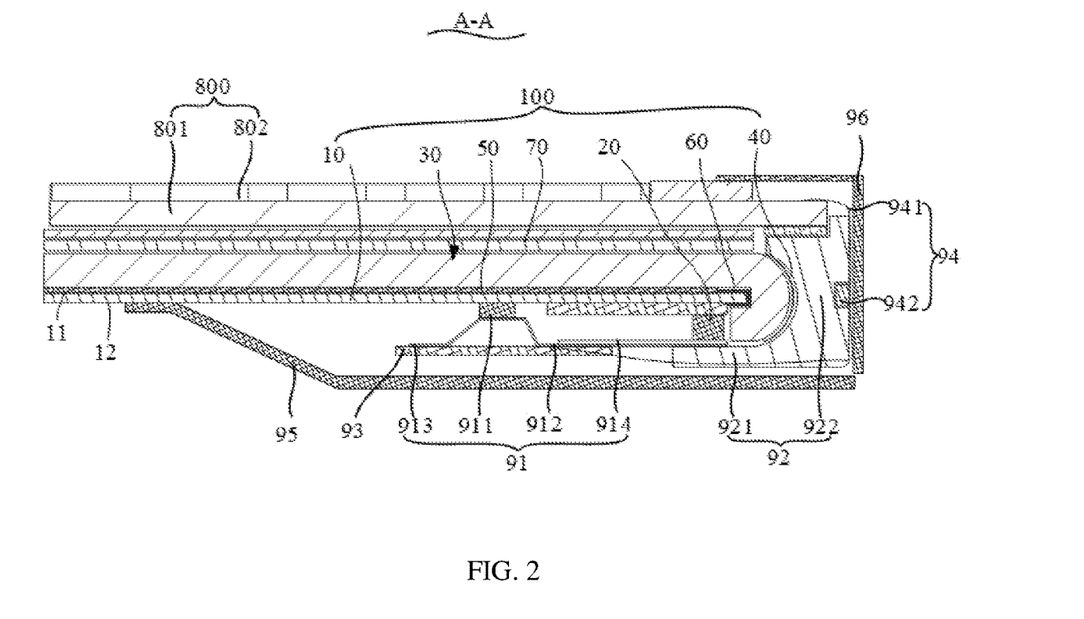
FIG. 2 is a cross-sectional view along line A-A of the display device shown in FIG. 1.
Figure 3:
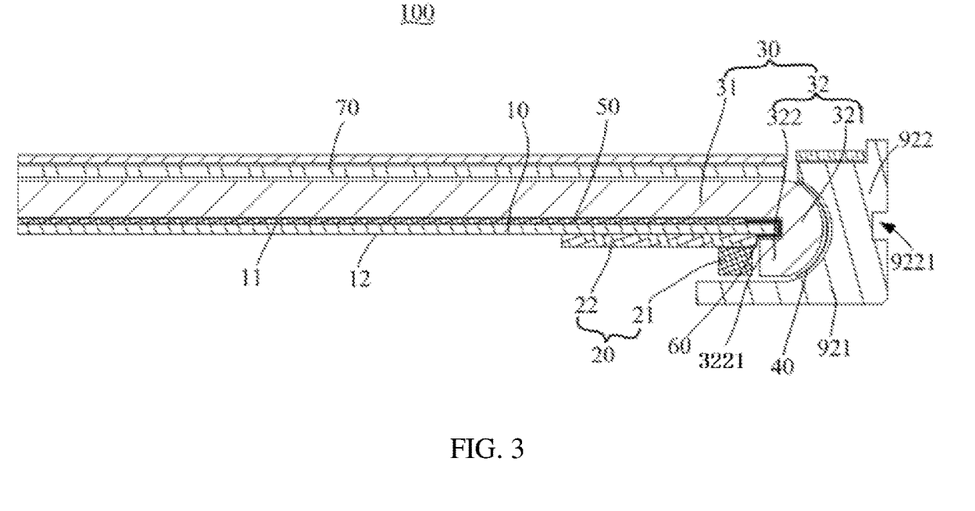
FIG. 3 is a cross-sectional view of a backlight module of the display device shown in FIG. 2.
Figure 4:
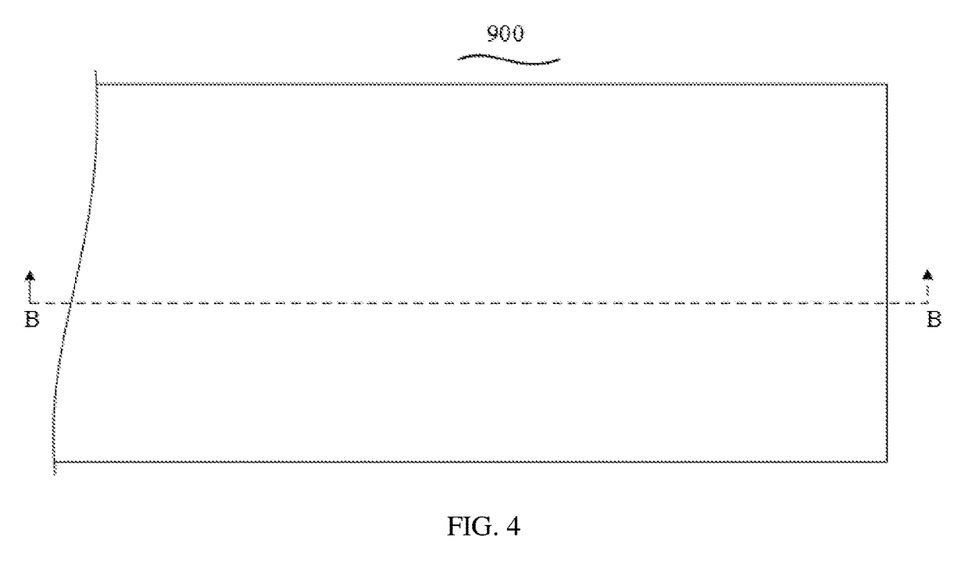
FIG. 4 is a top view of a display device according to another embodiment of the present disclosure.

The present disclosure provides a backlight module 100. As shown in FIG. 1 to FIG. 3, in an embodiment of the present disclosure, the backlight module 100 includes a backplane 10, a light source 20 and a light guide plate 30. The backplane 10 includes a first surface 11 and a second surface 12 opposite to the first surface 11. The light guide plate 30 includes a light output portion 31 provided on the first surface 11 and a bending portion 32 provided with a light input end on the second surface 12, and an end of the light output portion 31 facing the second surface 12 of the backplane 10 is bent and extended to form the bending portion 32. The light source 20 is provided on the second surface 12 and corresponds to a light input end face 3221 of the light input end.

In this embodiment, the backlight module 100 is a side-in backlight module 100, which includes the backplane 10, the light source 20 and the light guide plate 30. The backplane 10 is shaped in a plate, and generally, shaped in a rectangular parallelepiped plate. The light source 20 can be a light bar, or a strip-shaped illuminant composed of a plurality of lamp beads 21, and is installed on the second surface 12 of the backplane 10, namely, the rear surface. In an embodiment, the light source 20 includes a base body and a plurality of lamp beads 21 which are LED lamps with low cost and stable light output and are installed on the backplane 10 through an integrated substrate 22 to improve assembly efficiency. The base may be a flexible circuit board or a printed circuit board, which is not only for fixation, but also for realizing electrical connection and supplying power to the lamp beads 21, to effectively reduce assembly components. It can be understood that, the light guide plate 30 includes the light output portion 31 and the bending portion 32. The light output portion 31 provided with a light output side, is provided on the first surface 11, namely, a front surface of the backplane 10. The bending portion 32 is provided on an end face of the light output portion 31, and is bent and extended towards the second surface 12 of the backplane 10. The bending portion 32 is bent around an edge of the backplane 10, thereby effectively reducing a gap between the bending portion 32 and the backplane 10 and reducing a frame size. Both the light source 20 and the light guide plate 30 can be fixed to the backplane 10 by bonding, which is simple and convenient. The adhesive material can be liquid glue, solid glue, or a fixing adhesive tape such as a single-sided adhesive or a double-sided adhesive or the like, to achieve stable installation, reduce the occupied space, and effectively decrease the thickness of the backlight module 100.

To improve the utilization rate of light, the light source 20 is provided close to the edge of the backplane 10, and the bending portion 32 is bent at least 180 degrees. Thus, when the bending portion 32 is bent 180 degrees, the light input end face 3221 is just opposite to the light source 20 and part of the light input end face 3221 is placed on the second surface 12 of the backplane 10. That is, the bending portion 32 is provided with a surface parallel to the backplane 10 and extends towards the light source 20. The light input end face 3221 of the light guide plate 30 faces the light output side of the light source 20. The light emitted by the light source 20 enters the bending portion 32 and transmitted to the light output portion 31 through total reflection, then the light is emitted from an upper surface of the light output portion 31 to realize a surface light source 20. In addition, the light source 20 and the light output portion 31 are separated by the backplane 10, which can further reduce the heat radiation influence of the light source 20 on the light output portion 31, thereby prolonging the service life of the light guide plate 30. Furthermore, to further improve the safety, the lamp beads 21 are spaced apart from the bent portions by a certain safety distance. The safety distance can be independent of the frame size. Thus, the set value of the safety distance can be larger to effectively avoid the extrusion of the light guide plate 30 due to thermal expansion and improve the protection.

In the technical solution of the present disclosure, the backlight module 100 includes the backplane 10, the light guide plate 30 and the light source 20. The light guide plate 30 includes the light output portion 31 and the bending portion 32 formed by the end of the light output portion 31 bending and extending. The light output portion 31 is provided on the first surface 11 of the backplane 10, and the light source 20 is provided on the second surface 12 of the backplane 10. The bending portion 32 is provided on a side face of the backplane 10, and the light input end is provided on the second surface 12 of the backplane 10. The light emitted by the light source 20 is received by the light input end face 3221 of the light input end. The light guide plate 30 provided with the bending portion 32 and the light source 20 provided on the second surface 12 can not only reduce the restriction on the frame due to the size of the light source 20 and effectively realize a narrow frame, but also make the distance between the light source 20 and the light guide plate 30 not too small when the light guide plate 30 is heated and expanded. Thus, the light source 20 is effectively protected from damage, and the extension space of the backplane 10 is used to effectively reduce the thickness or the frame size. In addition, the bending portion 32 is provided with the light input end placed on the second surface 12 of the backplane 10. When the light source 20 is directed to the light input end face 3221, the light can smoothly enter the bending portion 32 through the resistance of the light input end, which reduces the probability of direct reflection of the light directed to the bending arc and effectively ensures the light guide effect and the light output effect of the backlight module 100. Furthermore, the light input end also enables the light guide plate 30 to be clamped on the edge of the backplane 10. Thus, the installation stability and relative positions of the light guide plate 30 and the backplane 10 are effectively ensured, and the structural stability of the backlight module 100 is improved.

As shown in FIG. 3, in an embodiment, the bending portion 32 includes a curved section 321 and a straight section 322. The curved section 321 is connected to the light output portion 31 and the straight section 322. The straight section 322 is the light input end and includes a surface parallel to a surface of the light output portion 31 and the light input end face 3221 perpendicular to the surface of the light output portion 31.

In this embodiment, the bending portion 32 includes the curved section 321 and the straight section 322. The curved section 321 is provided on the side face of the backplane 10 and is configured to transitionally connect the light output portion 31 and the straight section 322. The straight section 322 provided on the second surface 12, namely, a lower surface of the backplane 10, is the light input end and includes the surface parallel to the light output portion 31 and the light input end face 3221 perpendicular to the surface of the light output portion 31, that is, the straight section 322 is a rectangle. In this way, the light emitted by the light source 20 can be received by the straight section 322 as much as possible, which makes the amount of light received by the straight section 322 close to that received by the current light guide plate 30 shaped in a plate. Thus, on the basis of reducing the frame size, a light guide amount and a light guide effect of the light guide plate 30 are not affected.

As shown in FIG. 4 to FIG. 7, in an embodiment, a side of the curved section 321 away from the backplane 10 is an arc or a broken line on a longitudinal section of the backlight module 100, and/or a surface facing the backplane 10 and formed by an enclosure of the light output portion 31 and the bending portion 32 is a U-shaped surface.

The light output portion 31 is bent and extended to form the bending portion 32, and the shape of the bending portion 32 is not limited. In an embodiment, on the longitudinal section of the backlight module 100, the side of the curved section 321 away from the backplane 10 may be an arc, such as a circular arc, to make the curved section 321 provided with a smooth arc surface which is convenient for processing and assembly. Or the side of the curved section 321 away from the backplane 10 is a broken line, for example, the broken line is composed of two straight lines which are connected to each other. Therefore, a tapered surface is provided on the curved section 321 and the material of the curved section 321 is reduced. Or the broken line is composed of multiple straight lines connected end to end, and the curved section 321 is provided with multiple planes connected to each other. The size can be designed according to the actual situation, to facilitate the assembly and improve the installation stability.

On the basis that the surface of the curved section 321 away from the backplane 10 is an arc surface or a tapered surface, since the bending portion 32 is bent at least 180 degrees, the surface facing the backplane 10 and formed by the enclosure of the light output portion 31 and the bending portion 32 is configured to be U-shaped to better match the peripheral edge of the backplane 10, and the accuracy and stability of the installation are further improved.

As shown in FIG. 3, in an embodiment, at least a portion of the surface of the bending portion 32 away from the backplane 10 is provided with a first reflector 40, and/or a reflective piece 50 is provided between the light output portion 31 and the backplane 10.

In this embodiment, to avoid light leakage, the first reflector 40 is provided on the surface of the bending portion 32 away from the backplane 10. The first reflector 40 can be a reflective coating layer or the reflective piece 50, which is attached to a surface of the bending portion 32 and can further reflect the light transmitted from the bending portion 32 to make the light back to the light guide plate 30. Not only a light output amount is improved, but also an efficiency of the light source 20 is improved. The first reflector 40 may be provided on a whole surface of the bending portion 32 away from the backplane 10, such as each surface of the curved section 321 and the straight section 322 away from the backplane 10. Therefore, the light output amount can be increased to the greatest extent. Of course, the first reflector 40 may also be provided in a partial area of the bending portion 32, for example, only on the surface of the curved section 321 away from the backplane 10.

It can be understood that, after passing through the light input end face 3221 and entering the curved section 321, the light will be totally reflected, or partially transmitted and reflected. Then the light enters into the light output portion 31, and is reflected and transmitted on an upper surface and a lower surface of the light output portion 31. To ensure that the light is all reflected and emitted from a light output side of the upper surface, the reflective piece 50 is provided between the light guide plate 30 and the backplane 10. The material of the reflective piece 50 is generally a composite material of PET and TiO, which performs a good reflection effect, prevents the light from being emitted from the lower surface of the light output portion 31 and effectively increases the light output amount. Of course, in another embodiment, the material of the reflective piece 50 may also have a metal reflection structure or the like.

As shown in FIG. 2 and FIG. 3, in an embodiment, a thickness of the bending portion 32 is less than a thickness of the light output portion 31, and/or an end face of the backplane 10 facing the bending portion 32 is a curved surface, and/or the end face of the backplane 10 facing the bending portion 32 is coated with a protective layer 60.

To further facilitate bending, the thickness of the light guide plate 30 is non-uniform, that is, the thickness of the bending portion 32 is less than the thickness of the light output portion 31. Reducing the thickness of the bending portion 32 can facilitate bending and processing the bending portion 32, which ensures a bending effect and improves a structural stability of the bending portion 32. Of course, to further improve the bending effect, the thickness of the bending portion 32 is gradually decreased along a direction from an end close to the light output portion 31 to the light input end face 3221. Thus stress-concentrated areas and dead corners can be avoided, and a structural strength and a light guiding effect of the bending portion 32 can be ensured. In addition, a restriction on a design of the narrow frame from the bending portion 32 can be further reduced, and the frame size can be reduced. Of course, in another embodiment, the thickness of the bending portion 32 can also be reduced in a stepped or irregular manner.

Since the bending portion 32 bypasses an edge of the backplane 10 and forms the light input end face 3221 facing the light source 20, an end face of the backplane 10 facing the bending portion 32 is configured to be a curved surface to prevent a surface of the light guide plate 30 from being scratched or damaged by the corners of the backplane 10. For example, the corners of the backplane 10 are provided with chamfers, or end faces of the backplane 10 are provided with arc surfaces or the like. Therefore, the backplane 10 is provided with a smooth contact surface, which not only effectively improves the protection for the bending portion 32, but also improves the product yield. Of course, in another embodiment, a protective layer 60 may be coated on the end face of the backplane 10, and the protective layer 60 may be an anti-scratch film layer or a wear-resistant layer or the like. Moreover, the friction damage between the backplane 10 and the light guide plate 30 can also be reduced, to improve the product performance. In an embodiment, when the reflective piece 50 is provided between the light output portion 31 and the backplane 10, the protective layer 60 can be extended towards the first surface 11 to abut against the reflective piece 50 and towards the second surface 12 to abut against the light source 20 to achieve a protection on the largest area.

Of course, in another embodiment, the end face of the backplane 10 may be a curved surface coated with a protective layer 60 to obtain a better protective effect.

As shown in FIG. 3, in addition, to improve a light output efficiency and a light output effect, the backlight module 100 further includes an optical control component 70, namely, an optical film, which is provided on the light output portion 31 to form an output light with better effect. The optical control component 70 may be a prism sheet, a brightening sheet and a diffusion plate or the like. The prism sheet can improve a light uniformity, and the brightening sheet can increase a brightness of the output light, and the diffusion plate can increase an output angle of the output light to ensure that an edge of the light output portion 31 can also receive enough light. Therefore, the brightness of the edge is improved and a more uniform and stable light source 20 is provided. Of course, a plurality of optical control components 70 stacked in sequence can also be provided to further improve the uniformity and stability of the output light of the backlight module 100.

As shown in FIG. 4 to FIG. 7, the present disclosure provides a display device 900 including the backlight module 100 as described above and a display panel 800 provided on a light output side of the light output portion 31. Since the backlight module 100 of the display device 900 in the present disclosure applies the backlight module 100 of any of the above embodiments, the beneficial effects brought by the above embodiments will not be repeated here.

Figure 5:
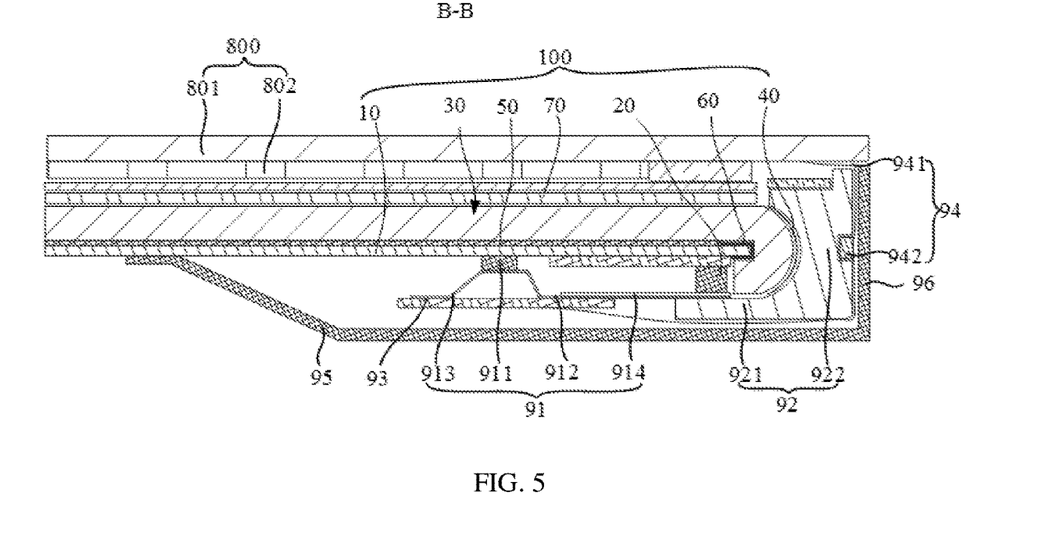
FIG. 5 is a cross-sectional view along line B-B of the display device shown in FIG. 4.
Figure 6:
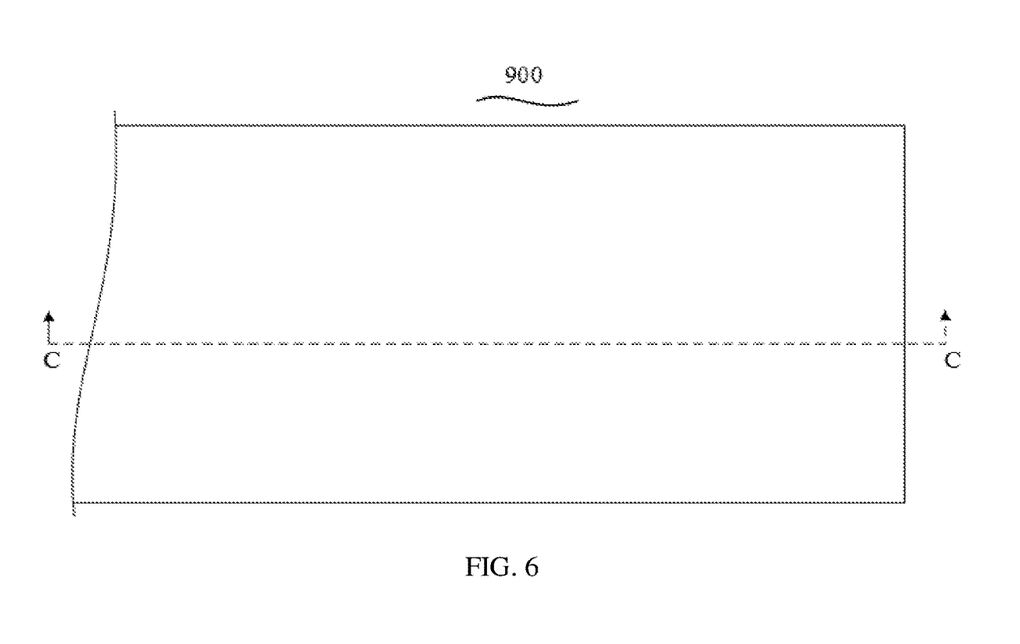
FIG. 6 is a top view of a display device according to yet another embodiment of the present disclosure.

As shown in FIG. 2 and FIG. 5, in an embodiment, the display device 900 further includes a bracket 91, which includes a fixation portion 911 installed on the second surface 12 and a shading portion 912 provided at an end of the fixation portion 911. The shading portion 912 extends towards the light source 20 and covers a side of the light source 20 away from the backplane 10.

In this embodiment, since the light source 20 is provided on the second surface 12, namely, hangs upside down on the backplane 10, the light emitted by the light source 20 will direct along a direction where is away from the backplane 10 and the bracket 91 is fixed to the backplane 10. The bracket 91 is provided with the shading portion 912 which can cover the side of the light source 20 away from the backplane 10. That is, the fixation portion 911 fixed on the second surface 12 of the backplane 10 and a substrate 22 of the light source 20 are set at intervals. One end of the shading portion 912 shaped in a sheet or a plate is connected to a surface of the fixation portion 911 away from the backplane 10, and another end extending towards the light source 20 is provided on a lower surface of the light source 20, which can completely cover the light source 20 to achieve a shading effect and prevent the light source 20 from leaking from the back of the backlight module 100. The fixation portion 911 may be fixed to the backplane 10 by bonding or welding, or may be connected to the backplane 10 by a removable way such as clamping or plugging. The bracket 91 can be made of metal to enable the bracket 91 to have a better shading effect and facilitate the heat dissipation of the light source 20.

Of course, in an embodiment, the shading portion 912 can also be abutted against the light source 20, namely, abutted against the lamp beads 21, to provide a certain supporting force for the light source 20 and further ensure the structural stability of the backlight module 100.

In an embodiment, a second reflector 914 is provided on a surface of the shading portion 912 facing the light source 20. Under a condition that a light emitted by the light source 20 towards the back of the backplane 10 is effectively covered, to effectively utilize the light, the second reflector 914 is provided between the shading portion 912 and the light source 20 to reflect the light, and increase a probability that the light enters the light guide plate 30 and a utilization rate of the light source 20.

As shown in FIG. 2 and FIG. 5, in an embodiment, the display device 900 further includes a middle frame 92. The middle frame 92 includes a bottom portion 921 and a side portion 922 connected to an edge of the bottom portion 921. The bottom portion 921 is supported on a surface of the shading portion 912 away from the light source 20, and the side portion 922 is attached to a surface of the bending portion 32 away from the backplane 10.

Of course, to make the installation of the light source 20 and the light guide plate 30 more stable, the display device 900 also includes the middle frame 92. The middle frame 92 includes the bottom portion 921 and the side portion 922, both of which are provided at an angle. The side portion 922 provided at a side of the bending portion 32 away from the backplane 10 can laterally limit the bending portion 32. Therefore, an inner surface of the side portion 922 matches an outer surface of the bending portion 32, and an installation stability of the first reflector 40 is ensured. The side portion 922 can also support the display panel 800, so that a certain light output distance is reserved between the light guide plate 30 and the display panel 800. Specifically, the bottom portion 921 is perpendicular to the side portion 922 and extends towards a side where the light source 20 is provided, which can limit the bending portion 32 and the light source 20 in the longitudinal direction. In an embodiment, the bottom portion 921 can abut against and support the shading portion 912 to further improve the compactness and stability of the structure.

Both the side portion 922 and the bottom portion 921 can be made of plastic or metal. When the material is plastic, the side portion 922 and the bottom portion 921 can be integrated by injection molding, and when the material is metal, the side portion 922 and the bottom portion 921 can be punched and then bent, which not only provides the structure with good strength and good stability, but also plays a better support and protection role. Of course, in an embodiment, the light source 20 can be provided on the middle frame 92, that is, installed on a surface of the bottom portion 921 facing the light guide plate 30, thus the material of the bracket 91 can be saved. Then the second reflector 914 can be provided on the surface of the bottom facing the light source 20 to improve the utilization rate of the light.

Figure 7:
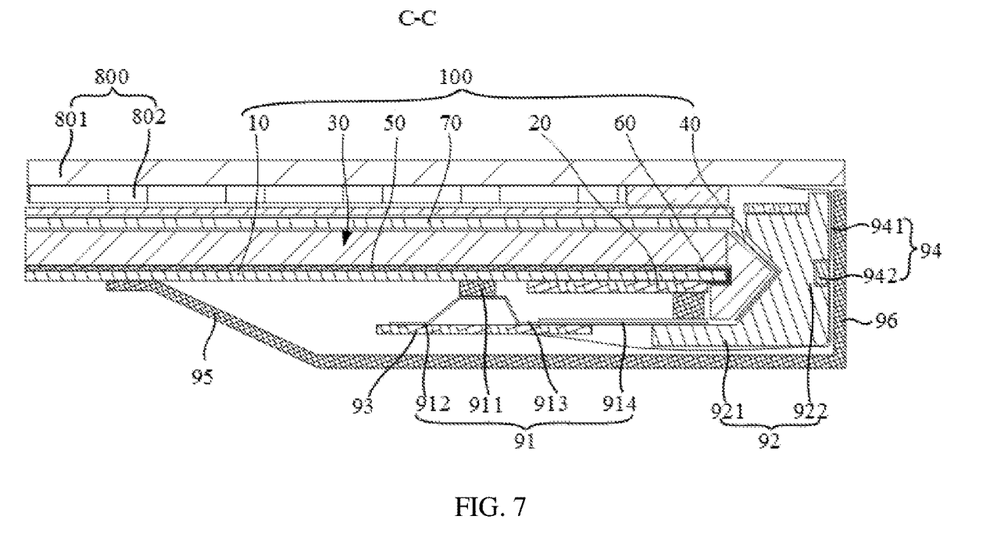
FIG. 7 is a cross-sectional view along line C-C of the display device shown in FIG. 6.

As shown in FIG. 5 and FIG. 7, the display device 900 further includes a main control board 93. In an embodiment, the bracket 91 further includes an installation portion 913 provided at another end of the fixation portion 911, and the main control board 93 is installed on each surface of the installation portion 913 and the shading portion 912 away from the light source 20 and electrically connected to the display panel 800 and the light source 20.

It can be understood that the display device 900 further includes the main control board 93 to provide the display panel 800 with display screen data and scanning voltages. The main control board 93 is installed on a lower surface of the backplane 10. The bracket 91 further includes the installation portion 913 which is also shaped in a plate and provided at an end of the fixation portion 911 away from the shading portion 912. The main control board 93 is installed on each surface of the installation portion 913 and the shading portion 912 away from the light source 20, and is set at an interval from the middle frame 92, which can simplify and integrate a structure for covering the light source 20 with a structure for fixing the main control board 93 to improve the integration degree of the display device 900. In addition, the shading portion 912 and the installation portion 913 are integrated to install the main control board 93, which can improve the structural stability and reduce an area occupied by the bracket 91.

The shading portion 912 and the installation portion 913 both extend for a certain length in opposite directions towards a side away from the backplane 10. Therefore, an avoidance cavity is formed by an enclosure of the shading portion 912, the installation portion 913 and the backplane 10. When being installed on the installation portion 913 and the shading portion 912, part of the main control board 93 faces the avoidance cavity, which can effectively improve a heat dissipation effect. Furthermore, the installation portion 913 and the shading portion 912 are integrated, and a material of the integration is a metal sheet, which can be produced by bending easily and conveniently. The material can not only effectively improve a processing efficiency, but also further improve the heat dissipation effect. In addition, the metal bracket 91 can be connected to each ground signal of the main control board 93 and the backplane 10, which is beneficial to connecting to ground.

Of course, in another embodiment, the main control board 93 can also be installed on a surface of the shading portion 912 away from the light source 20, or only installed on a surface of the installation portion 913 away from the backplane 10.

As shown in FIG. 2 and FIG. 5, in an embodiment, the display device 900 includes an array substrate 801 and a color filter substrate 802 opposite to the array substrate 801. A portion of the array substrate 801 beyond the color filter substrate 802 is electrically connected to the main control board 93 through a chip on film 94, and the chip on film 94 is attached to and extends along a surface of the middle frame 92 away from the light guide plate 30. The middle frame 92 is provided with a receiving groove 9221 for holding chips of the chip on film 94.

It can be understood that the array substrate 801 is provided with a thin film transistor that controls each pixel to be turned on, thereby an edge of the array substrate 801 is provided with a fan-out structure to make the array substrate 801 electrically connected to the main control board 93 through the chip on film 94. The chip on film 94 includes a film base 941 and a wafer 942 provided thereon. To further reduce the width of the frame, the receiving groove 9221 is provided on the surface of the middle frame 92 away from the light guide plate 30, and the film base 941 is attached to and extends along the surface of the middle frame 92. Furthermore, the wafer 942 is hold by the receiving groove 9221. Therefore, a lateral width occupied by the chip on film 94 can be minimized and a narrower frame is further realized.

Specifically, assembling the display device 900 includes the following steps.

Figure 8:
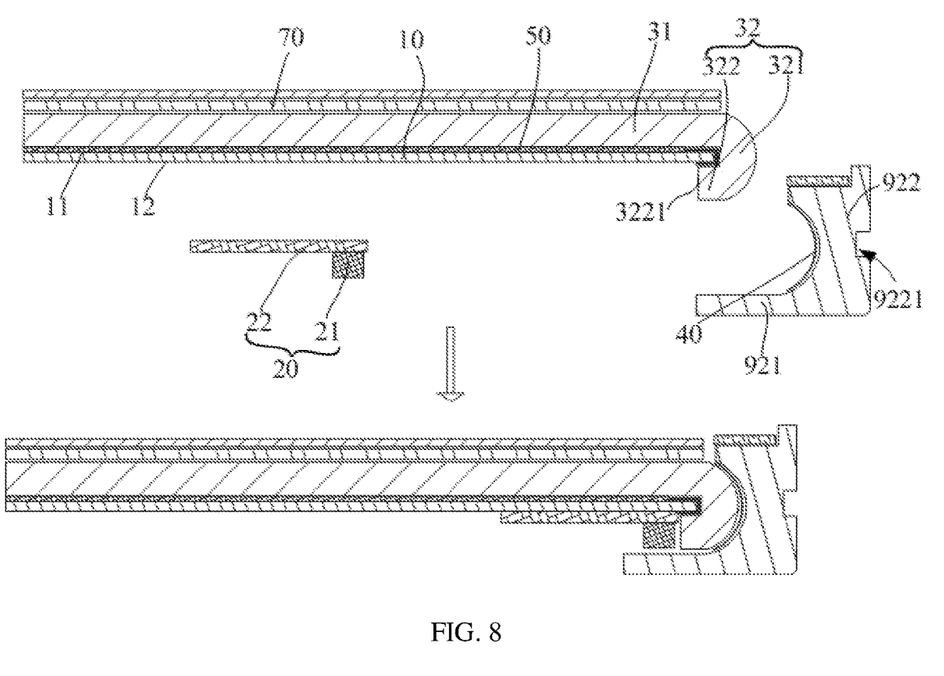
FIG. 8 to FIG. 10 are schematic views showing an assembly process of the display device shown in FIG. 4.

As shown in FIG. 8, the light guide plate 30 and the light source 20 are installed firstly. The light guide plate 30 is installed on the backplane 10, and the middle frame 92 is correspondingly installed on one side of the bending portion 32. The light source 20 is installed on the second surface 12 of the backplane 10 and corresponds to the light input end face 3221 of the bending portion 32. This way can ensure that after the light guide plate 30 is installed stably, the light source 20 is installed in a targeted manner, thereby the accuracy of the installation position of the light source 20 is improved, and the safety distance between the light source 20 and the light guide plate 30 can be reasonably designed to reduce the damage probability. In addition, when installing the reflective piece 50 and the optical film, the reflective piece 50 is firstly bonded, then the light guide plate 30 is secondly bonded, and finally the optical film is installed over the light guide plate 30. When installing the first reflector 40 and the protective layer 60, the protective layer 60 is provided on the backplane 10 before installing the light guide plate 30, to reduce the damage to the light guide plate 30 and improve the protection. Then the first reflection piece is clamped between the bending portion 32 and the middle frame 92.

Figure 9:
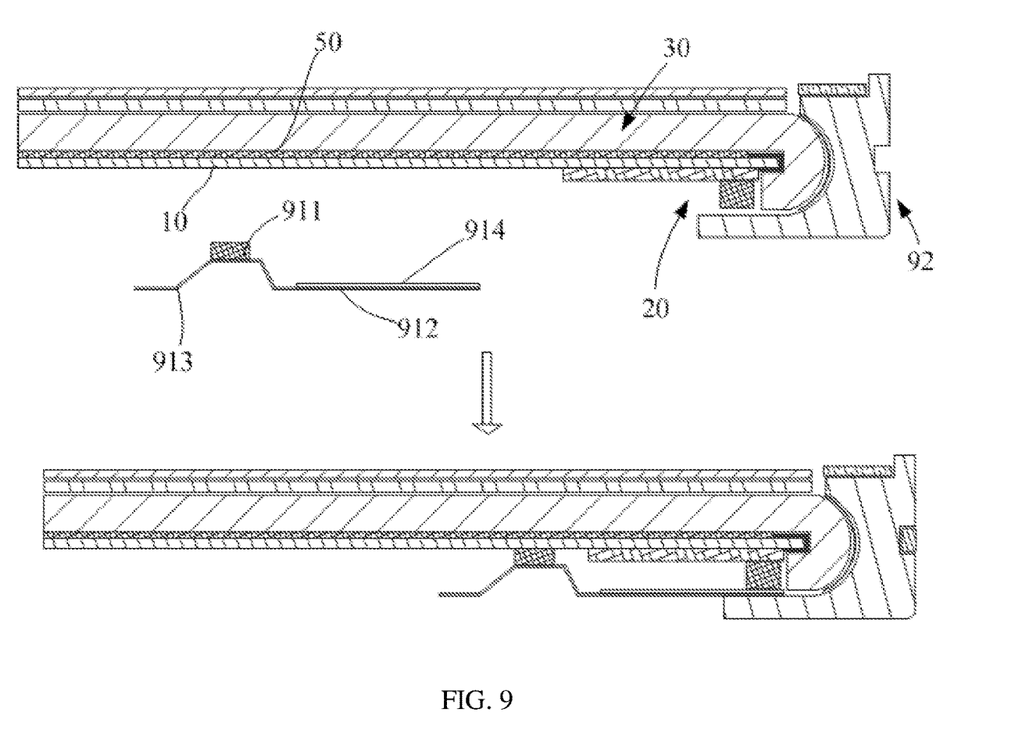

As shown in FIG. 9, the bracket 91 is installed secondly. The fixation portion 911 is adhered to the second surface 12 of the backplane 10, and the shading portion 912 is placed below the light source 20. Of course, the fixation portion 911 can also be fixed to the backplane 10 through thread. According to the position of the light source 20, the fixed position of the fixation portion 911 is determined, which can ensure that the shading portion 912 completely covers the light source 20 and improve the shading effect. When installing a second reflector 914, the second reflector 914 is first attached to an upper surface of the shading portion 912, and then the fixation portion 911 is installed. In this way, not only the convenience can be improved, but also the convenient installation of the bracket 91 can be prevented from being interfered by the shade between the shading portion 912 and the light source 20.

Figure 10:
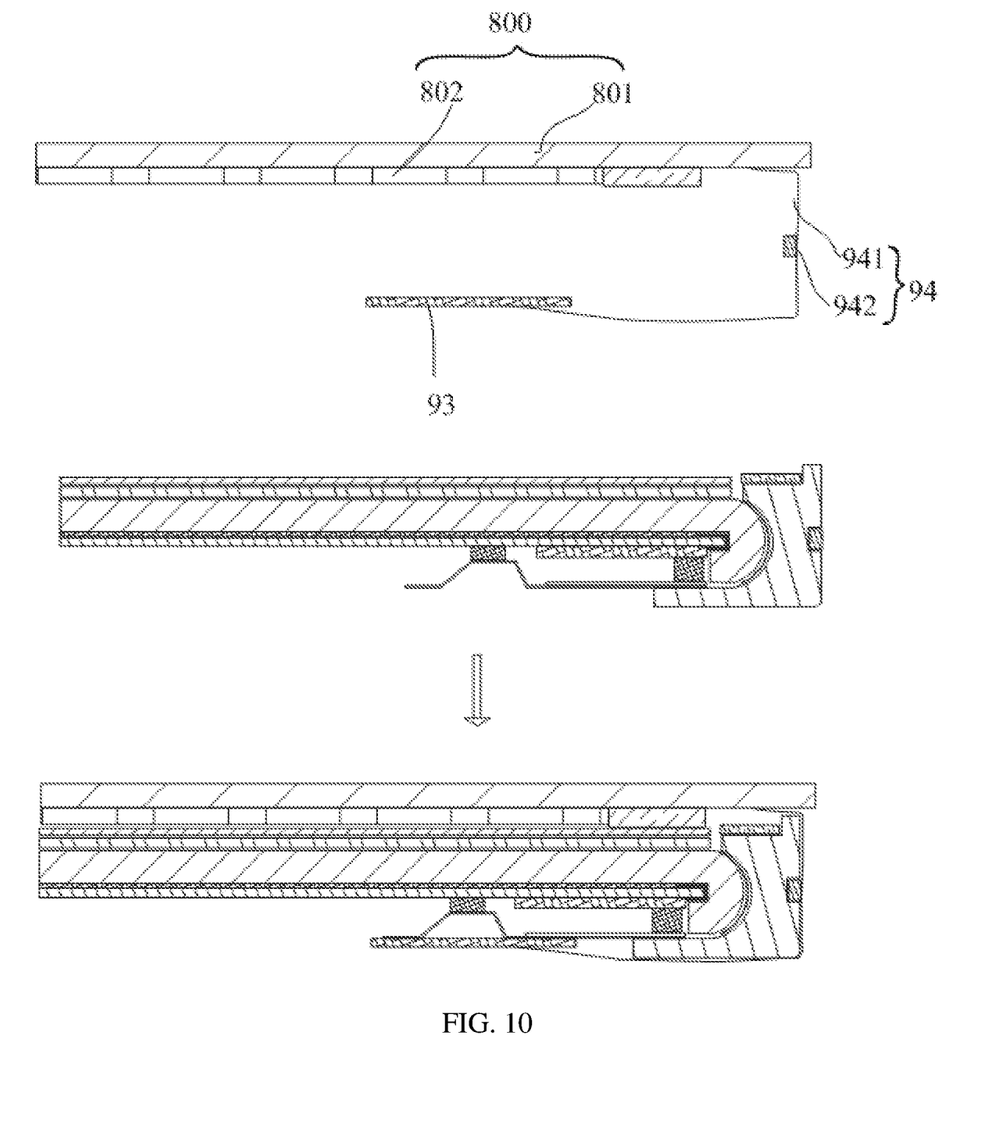

As shown in FIG. 10, the display panel 800 is installed to the backlight module 100 thirdly. The array substrate 801 and the color filter substrate 802 are pressed against each other. An end of the chip on film 94 is connected to the edge of the array substrate 801, and another end is connected to the main control board 93. Then, the edge of the array substrate 801 is overlapped to an upper surface of the middle frame 92, and the color filter substrate 802 is provided on the array substrate 801. The chip on film 94 is attached to and extended along the outer surface of the middle frame 92. Finally the main control board 93 is placed under the bracket 91 and fixed by bonding or welding. In this way, the electrical connection can be finished in advance under the condition of convenient placement, and then the chip on film 94 can be attached to the middle frame 92, thereby further improving the convenience of assembly, and the occupation space and the influence of the display panel 800 on other components can be reduced.

Finally, a front frame 96 and a rear frame 95 are installed. The display panel 800 further includes the front frame 96 and the rear frame connected to each other. To form a stable installation structure and realize a narrow frame structure of the display device 900, the front frame 96 covers an edge of the display panel 800, and the rear frame 95 covers the main control board 93, the middle frame 92 and the back of the backplane 10.

As shown in FIG. 5 and FIG. 7, in addition, when the color filter substrate 802 is provided towards a side of the light guide plate 30, the array substrate 801 overlaps the upper surface of the middle frame 92, and the front frame 96 may not cover the edge of the array substrate 801, thereby realizing a borderless structure of the display device 900.

The above are only preferred embodiments of the present disclosure and are not to limit the scope of the present disclosure. Under the concept of the present disclosure, any equivalent structural transformations made by using the contents of the description and drawings of the present disclosure, or any direct or indirect application to other related technical fields is included in the scope of the claims.

What is claimed is:

1. A backlight module comprising:
    a backplane;
    a light guide plate; and
    a light source,
    wherein:
    the backplane comprises a first surface and a second surface opposite to the first surface;
    the light guide plate comprises a light output portion provided on the first surface and a bending portion provided with a light input end on the second surface, and an end of the light output portion facing the second surface of the backplane is bent and extended to form the bending portion;
    the light source is provided on the second surface and corresponds to a light input end face of the light input end;
    a thickness of the bending portion is less than a thickness of the light output portion;
    an end face of the backplane facing the bending portion is a curved surface;
    the end face of the backplane facing the bending portion is coated with a protective layer; and
    the thickness of the bending portion is gradually decreased along a direction from an end close to the light output portion to the light input end face, and the protective layer is an anti-scratch film layer.

2. The backlight module of claim 1, wherein:
    the backlight module is a side-in backlight module;
    the backplane is shaped in a plate;
    the light source is a strip-shaped illuminant composed of a plurality of lamp beads and provided on the second surface; and
    the light guide plate is fixed to the backplane by bonding.

3. The backlight module of claim 1, wherein:
    the bending portion comprises a curved section and a straight section;
    the curved section is connected to the light output portion and the straight section; and
    the straight section is the light input end and comprises a surface parallel to a surface of the light output portion and the light input end face perpendicular to the surface of the light output portion.

4. The backlight module of claim 3, wherein:
    a side of the curved section away from the backplane is an arc or a broken line on a longitudinal section of the backlight module; and/or
    a surface facing the backplane and formed by an enclosure of the light output portion and the bending portion is a U-shaped surface.

5. The backlight module of claim 1, wherein:
    at least a portion of the surface of the bending portion away from the backplane is provided with a first reflector; and/or
    a reflective piece is provided between the light output portion and the backplane.

6. The backlight module of claim 5, wherein the first reflector is a reflective coating layer attached to a surface of the bending portion, and a material of the reflective piece is a composite material of PET and TiO.

7. The backlight module of claim 1, further comprising:
    an optical control component stacked in sequence, wherein the optical control component is a prism sheet provided on the light output portion.

8. A display device comprising:
a display panel provided on a light output side of a light output portion; and
a backlight module comprising a backplane, a light guide plate and a light source,
a bracket,
wherein:
the backplane comprises a first surface and a second surface opposite to the first surface;
the light guide plate comprises a light output portion provided on the first surface and a bending portion provided with a light input end on the second surface, and an end of the light output portion facing the second surface of the backplane is bent and extended to form the bending portion;
the light source is provided on the second surface and corresponds to a light input end face of the light input end; and
the bracket comprises a fixation portion installed on the second surface and a shading portion provided at an end of the fixation portion, and the shading portion extends towards the light source and covers a side of the light source away from the backplane.

9. The display device of claim 8, further comprising:
a middle frame,
wherein:
the middle frame comprises a bottom portion and a side portion connected to an edge of the bottom portion;
the bottom portion is supported on a surface of the shading portion away from the light source, and
the side portion is attached to a surface of the bending portion away from the backplane.

10. The display device of claim 9, wherein:
the bottom portion is perpendicular to the side portion;
the side portion and the bottom portion are made of plastic and integrated by injection molding; and
an inner surface of the side portion matches an outer surface of the bending portion.

11. The display device of claim 10, further comprising:
a main control board,
wherein:
the bracket further comprises an installation portion provided at an another end of the fixation portion; and
the main control board is installed on each surface of the installation portion and the shading portion away from the light source and electrically connected to the display panel and the light source.

12. The display device of claim 11, wherein the shading portion and the installation portion both extend in opposite directions towards a side away from the backplane, and an avoidance cavity is formed by an enclosure of the shading portion, the installation portion and the backplane.

13. The display device of claim 12, wherein:
a second reflector is provided on a surface of the shading portion facing the light source; and/or
the display panel comprises an array substrate and a color filter substrate opposite to the array substrate; and
a portion of the array substrate beyond the color filter substrate is electrically connected to the main control board through a chip on film, the chip on film is attached to and extends along a surface of the middle frame away from the light guide plate, and the middle frame is provided with a receiving groove for holding chips of the chip on film.

* * * * *